No. 883,338. PATENTED MAR. 31, 1908.
A. T. PFEIFF.
APPARATUS FOR COOLING AND VENTILATING MILK, CREAM, &c.
APPLICATION FILED AUG. 14, 1907.

UNITED STATES PATENT OFFICE.

ALEXANDER THEODOR PFEIFF, OF STOCKHOLM, SWEDEN.

APPARATUS FOR COOLING AND VENTILATING MILK, CREAM, &c.

No. 883,338.      Specification of Letters Patent.      Patented March 31, 1908.

Application filed August 14, 1907. Serial No. 388,540.

*To all whom it may concern:*

Be it known that I, ALEXANDER THEODOR PFEIFF, a citizen of the Kingdom of Sweden, residing at Stockholm, Sweden, have invented new and useful Improvements in Apparatus for Cooling and Ventilating Milk, Cream, and the Like, of which the following is a specification.

This invention relates to an improved apparatus for cooling and ventilating milk, cream and the like, of the kind in which the liquid is caused to flow out on to cooled surfaces and is on its way met by a current of cold sterilized air.

The object of the invention is to increase to the highest possible degree the effect of the cooling action and of the current of air so as to remove from the liquid practically every trace of bad-smelling gases, whereby the liquid will obtain a pure and fresh taste and a highly increased tenableness.

The invention consists, chiefly, in that the cooling surface is a suitably circular disk of slightly curved or conical shape, in the center of which is provided a distributer for the liquid to be treated and at the circumference of which is provided a perforated air distributing pipe the perforations of which are so placed that the air will be uniformly or substantially uniformly forced over the disk towards the center thereof.

In the accompanying drawing I have shown two embodiments of my invention in vertical section.

Figure 1:
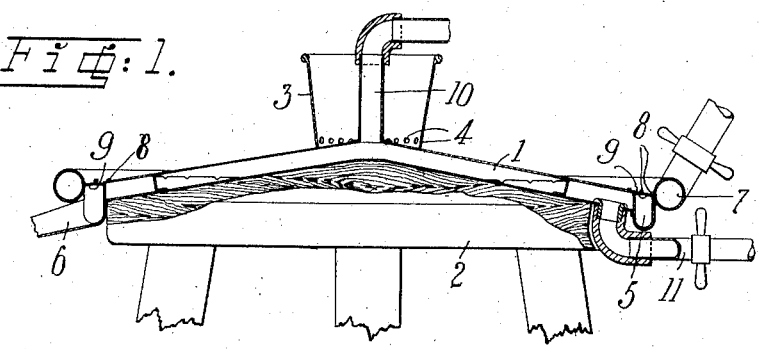

Referring to Figure 1 the apparatus consists of a flat holder 1 of slightly conical shape, in the interior of which is placed a suitable cooling agent and which is supported by a base 2. At the center of the upper wall of the holder is provided a funnel 3 having outlet openings 4 for the uniform distribution of the liquid, herebelow referred to as milk, over the surface of the said upper wall. At the circumference of the holder is provided an annular gutter 5 having an outlet 6 for leading off the milk accumulating in said gutter. Outside the latter is provided an air distributing pipe 7 having a number of small outlet openings 8 which direct the jets of air along the upper surface of the holder. For guiding the jets of air an inward flange 9 may be secured to the outer edge of the gutter. The air supplied to the said distributing pipe should, suitably, be cooled, purified and sterilized. The cooling agent, which may consist of a freezing mixture, cold water, or the like, depending on the degree of cooling desired, is admitted through a pipe 10 at the center of the holder and is led off through a pipe 11 at the circumference thereof. If desired the pipe 11 may be used as admission pipe and the pipe 10 as outlet pipe.

When the milk flows out in a hot condition on to the almost horizontal upper surface of the holder 1, it will be subjected to a sudden strong cooling action which will be accompanied by a rapid escape of bad-smelling gases contained in the milk, such escape being accelerated by cold purified and sterilized air flowing against the direction of flow of the milk. Hereby the quality of the milk will be greatly increased.

The apparatus shown in Fig. 1 is especially suitable for treating milk, cream and the like, when the temperature of the liquid is comparatively high and only a moderate cooling is desired.

Figure 2:
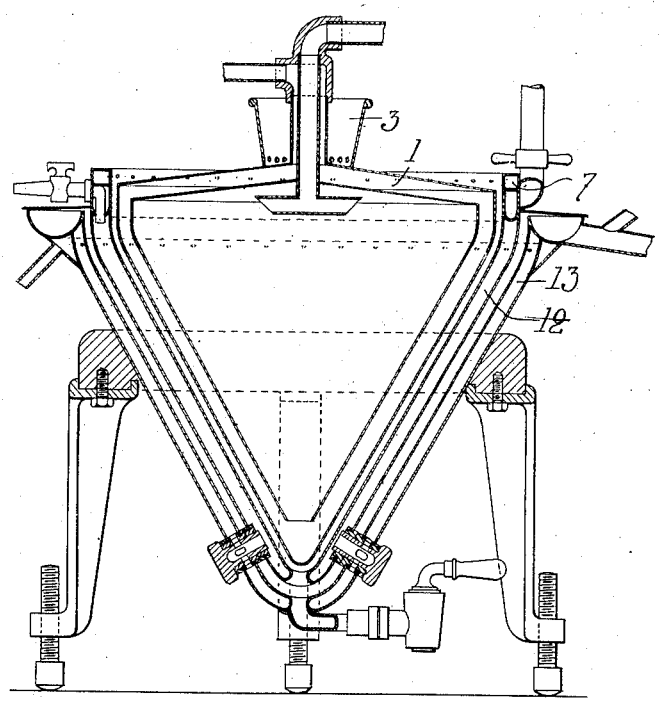

In the apparatus shown in Fig. 2 the slightly conical cooling surface of the holder 1, the distributing funnel 3, and the air distributing pipe 7 are substantially the same as in Fig. 1. The holder 1 is, however, extended downwards and for the gutter 5 in Fig. 1 is substituted an annular and in vertical section U-shaped cooling channel formed by the downward extension of the holder 1 and two holders 12 and 13 concentric therewith and provided with arrangements for letting through a cooling agent. The arrangement of said holders is *per se* of well known construction. They are tapering downwards but may also be cylindrical.

Having now described my invention, what I claim as new and desire to secure by Letters Patent is:

1. An apparatus for cooling and ventilating hot milk, cream and the like, comprising a cooling-agent holder, of circular form in plan, the upper side of which is inclined downward from its central portion outward, a receptacle arranged over the central portion of the holder and having a plurality of radially disposed apertures in its lower portion, and an air-distributing pipe arranged at the circumference of the holder and having apertures arranged to discharge air over the holder toward the center thereof.

2. An apparatus for cooling and ventilating hot-milk, cream and the like, comprising a cooling-agent holder, of circular form in plan, the upper side of which is inclined downward from its central portion outward;

said holder having an inlet and an outlet, a receptacle arranged over the central portion of the holder and having a plurality of radially disposed apertures in its lower portion, an air-distributing pipe arranged at the circumference of the holder and having apertures arranged to discharge air over the holder toward the center thereof, and an annular device arranged to receive the liquid from the upper side of the holder and having a discharge for said liquid.

3. An apparatus for cooling and ventilating hot milk, cream and the like, comprising a cooling-agent holder, of circular form in plan, the upper side of which is inclined downward from its central portion outward, and an air-distributing pipe arranged at the circumference of the holder and having apertures arranged to discharge air over the holder toward the center thereof In testimony whereof I have subscribed this specification in the presence of two subscribing witnesses.

ALEXANDER THEODOR PFEIFF.

Witnesses:
   EDW. DELMAR,
   JOHN DELMAR.